US006617542B2

(12) United States Patent
Hayen et al.

(10) Patent No.: US 6,617,542 B2
(45) Date of Patent: Sep. 9, 2003

(54) METHOD OF LASER POLISHING SURFACES ON A HEAD SUSPENSION ASSEMBLY

(75) Inventors: Fredrick V. Hayen, Dassel, MN (US);
Nathan M. Kinkaid, Martinez, CA (US); Mark R. Christianson, Darwin, MN (US); Hryhory T. Koba, Hutchinson, MN (US)

(73) Assignee: Hutchinson Technology, Inc., Hutchinson, MN (US)

( * ) Notice: Subject to any disclaimer, the term of this patent is extended or adjusted under 35 U.S.C. 154(b) by 0 days.

(21) Appl. No.: 10/117,870

(22) Filed: Apr. 8, 2002

(65) Prior Publication Data

US 2003/0019853 A1 Jan. 30, 2003

Related U.S. Application Data

(63) Continuation-in-part of application No. 09/911,662, filed on Jul. 24, 2001, now abandoned.

(51) Int. Cl.[7] ............................................... B23K 26/00
(52) U.S. Cl. ................................................ 219/121.69
(58) Field of Search ...................... 219/121.68, 121.69, 219/121.6, 121.61, 121.63, 121.64, 121.65, 121.66; 29/603.03; 360/102, 103, 104

(56) References Cited

U.S. PATENT DOCUMENTS 4,671,848 A    6/1987  Miller et al.
5,060,099 A *  10/1991 Yaeger et al. ............. 360/254.5
5,428,490 A    6/1995  Hagen
5,612,841 A *  3/1997  Johnson .................... 360/245.2
5,739,982 A    4/1998  Arya et al.
5,877,920 A *  3/1999  Resh ........................ 360/245.7
5,959,801 A    9/1999  Gillis et al.
6,011,239 A    1/2000  Singh et al.
6,078,470 A    6/2000  Danielson et al.
6,087,620 A    7/2000  Brooks, Jr. et al.
6,153,284 A    11/2000 Gui et al.
6,172,853 B1   1/2001  Davis et al.
6,195,234 B1   2/2001  Sundaram et al.
6,212,042 B1   4/2001  Gui et al.

FOREIGN PATENT DOCUMENTS

JP    10-199164     7/1998
JP    11-096527     4/1999
WO    WO 91/01514   2/1991
WO    WO 00/63890   10/2000

* cited by examiner

*Primary Examiner*—Tom Dunn
*Assistant Examiner*—Jonathan Johnson
(74) *Attorney, Agent, or Firm*—Faegre & Benson LLP (57) ABSTRACT

A method of treating an operative surface on a head suspension with laser energy. A laser beam is patterned such that a single pulse extends across the entire operative surface. One or more pulses of the laser energy is applied to the operative surface sufficient to melt the operative surface. The melting serves to polish, smooth and/or reshape the operative surface.

30 Claims, 7 Drawing Sheets

METHOD OF LASER POLISHING SURFACES ON A HEAD SUSPENSION ASSEMBLY

The present application is a continuation-in-part of U.S. patent application Ser. No. 09/911,662, entitled METHOD OF LASER POLISHING SURFACES ON A HEAD SUSPENSION ASSEMBLY, filed Jul. 24, 2001 now abandoned.

FIELD OF THE INVENTION

The present invention relates to a method of treating surfaces on a magnetic head disk drive suspension, and in particular, to laser treating operative surfaces of head lift pads and load point dimples on a head suspension.

BACKGROUND OF THE INVENTION

In a dynamic rigid disk storage device, a rotating disk is employed to store information. Rigid disk storage devices typically include a frame to provide attachment points and orientation for other components, and a spindle motor mounted to the frame for rotating the disk. A read/write head is formed on a "head slider" for writing and reading data to and from the disk surface. The head slider is supported and properly oriented in relationship to the disk by a head suspension that provides both the force and compliance necessary for proper head slider operation. As the disk in the storage device rotates beneath the head slider and head suspension, the air above the disk also rotates, thus creating an air bearing which acts with an aerodynamic design of the head slider to create a lift force on the head slider. The lift force is counteracted by a spring force of the head suspension, thus positioning the head slider at a desired height and alignment above the disk that is referred to as the "fly height."

Typically, the magnetic head is about 0.02 microns away from the disk while the disk is moving. In most disk drives it is important for the magnetic head and disk surface not to come in contact when the disks are not rotating (i.e., when the hard drive is not powered). If a disk and magnetic head are at rest and in contact for a period of time, the head and disk surface can stick together, resulting in damage to the disk surface when the disks start to rotate. In some cases the stiction force can prevent the disks from rotating altogether. Also, the disk must start from rest, and a certain minimum velocity is required for the magnetic head to float over the disk surface. Therefore, each startup of the hard drive can result in the magnetic head and disk surface rubbing for a distance until the disk achieves sufficient speed to form the air cushion.

For these reasons, load/unload ramp structures have been used in some hard drives to hold the magnetic heads away from the disk surfaces while the hard drive is not operating. The magnetic heads are released from the ramp structure when the disks have achieved the minimum speed for causing the magnetic heads to float above disk surfaces.

Figure 1:
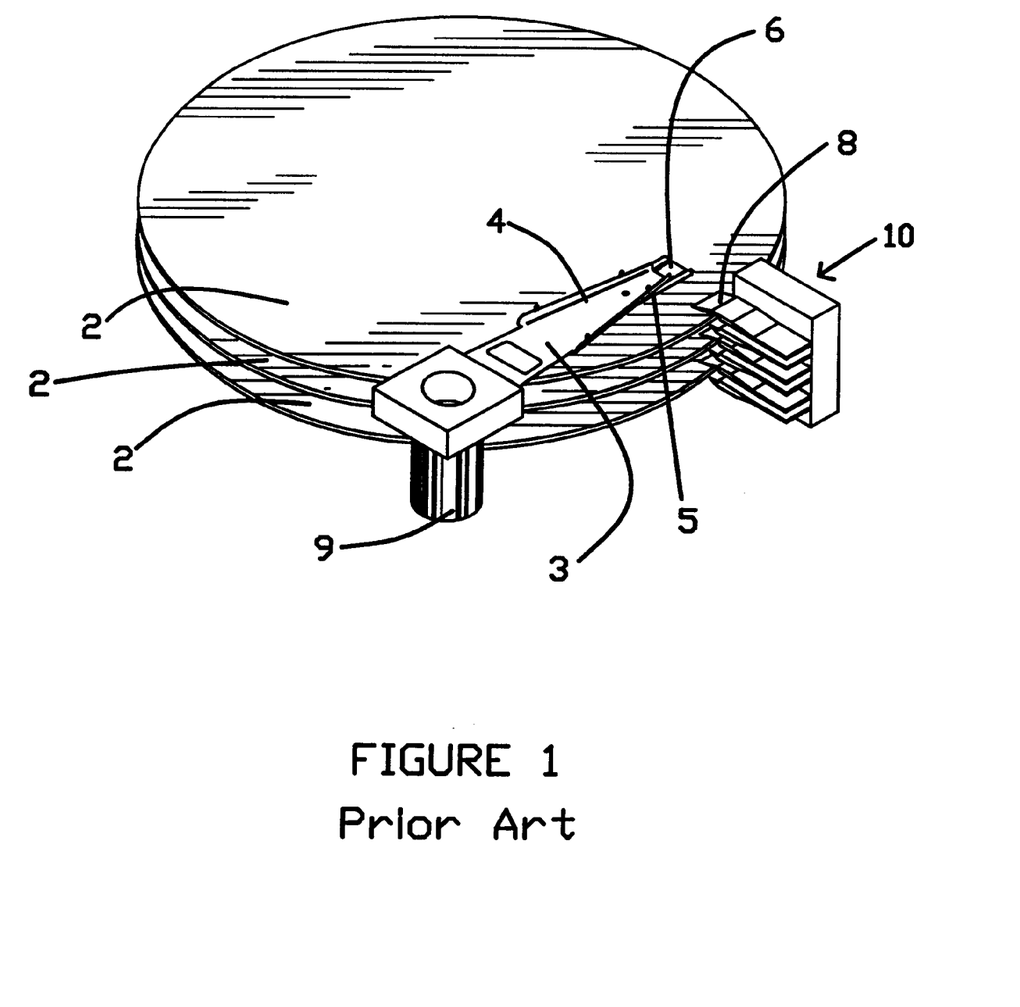
FIG. 1 illustrates internal components of a data storage hard drive according to the prior art.

FIG. 1 shows a typical load/unload type hard drive with three disks 2. An actuator arm 3 supports a suspension 4, a slider 5 and a lift tab 6. A magnetic read/write head (not shown) is located on a bottom surface of the slider 5. The suspension 4 and slider 5 together comprise a head gimbal assembly. The actuator arm 3 pivots about a pivot post 9. The lift tab 6 is positioned on the suspension 4 so that it engages a ramp 8 on a ramp structure 10. The ramp 8 imparts an upward force on the lift tab 6, which lifts the slider 5 and magnetic head away from the disk 2. The magnetic head is thereby not in contact with the disk 2 whenever the lift tab 6 is moved onto the ramp 8. In order for the lift tab 6 to lift the slider from the disk, the lift tab must rub against the ramp 8. The ramp structure 10 is typically made from low-friction polymer materials. Low friction ramps 8 reduce the amount of energy required to unload the magnetic heads (a concern during unpowered unloading).

Lift tabs are typically made of metal such as stainless steel. Since they are harder than the ramp structure (made of plastic), the lift tab may abrade the ramp during loading and unloading. Abrasion creates contaminate particles within the hard drive that can damage the sensitive slider/disk interface. It is therefore necessary for the bottom lift tab surface (which contacts the ramp) to be as smooth as possible. A smooth lift tab surface produces fewer particles when rubbed over the surface of the ramp.

Figure 2:
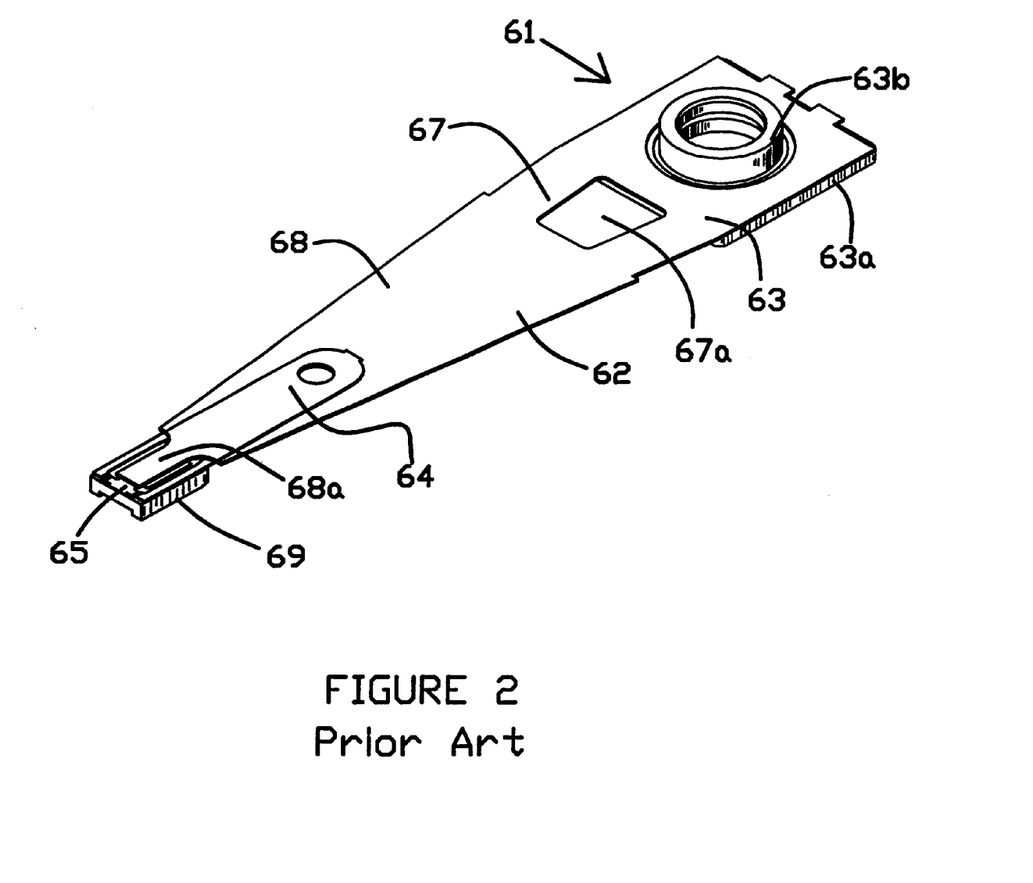
FIG. 2 shows a head suspension with a load point dimple according to the prior art.
Figure 3:
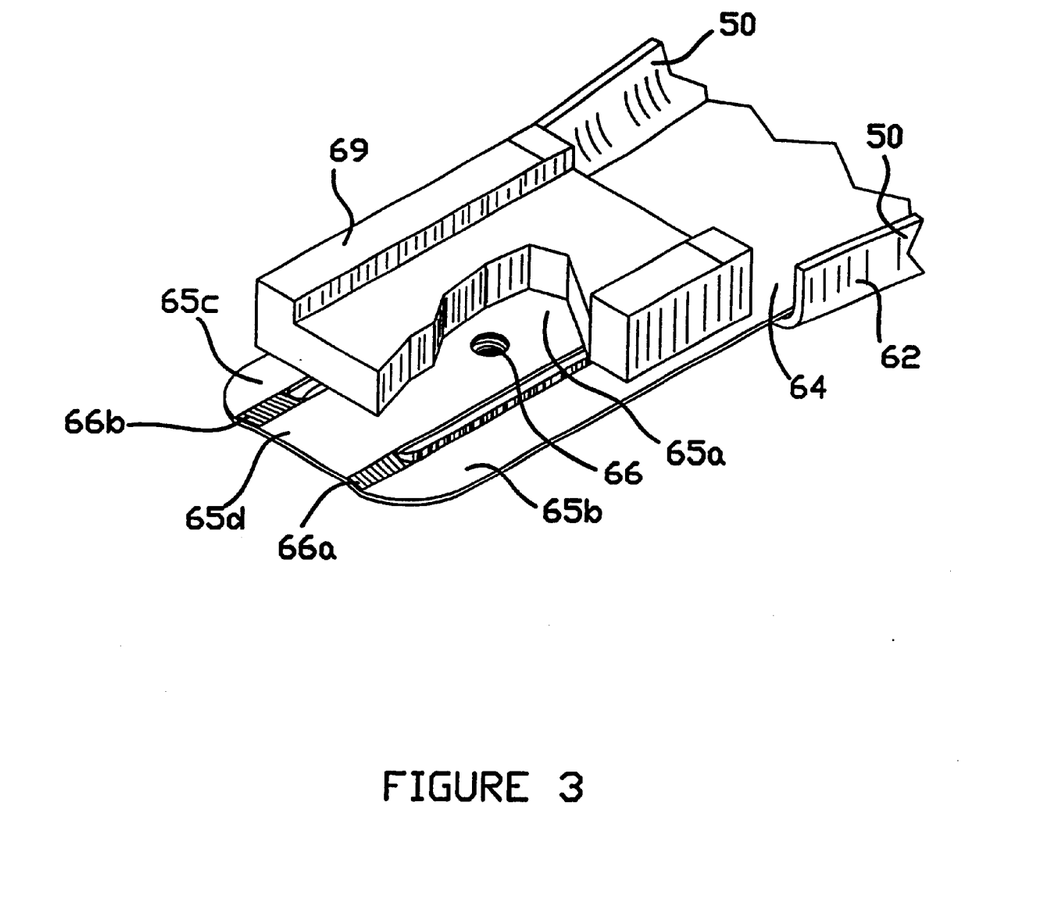
FIG. 3 is a perspective cut-away bottom view of the gimbal of FIG. 2.

In addition to lift tabs, certain types of head suspensions include a generally spherical dimple having a convex surface formed in either the load beam or the cantilever region of the flexure, such as disclosed in U.S. Pat. No. 6,078,470 (Danielson et al.). FIGS. 2 and 3 illustrate a head suspension assembly comprising a head suspension 61 with a load point dimple and a head slider 69. The head suspension 61 includes a load beam 62 and a flexure 64 on a distal end of load beam 62. Load beam 62 is generally comprised of a mounting region 63 on a proximal end of load beam 62, a rigid region 68, and a spring region 67 between mounting region 63 and rigid region 68.

Mounting region 63 further includes base plate 63a, secured to load beam 62 by conventional means such as spot welds, and mounting structure 63b for mounting head suspension 61 to a rotary actuator of a rigid disk drive (see FIG. 1). Mounting structure 63b enables head suspension 61 to be positioned over an associated disk so the head can read data from or write data to the disk during the normal operation of the disk drive. Spring region 67 generally includes a bend or radius to provide a spring force used to counteract the aerodynamic lift force acting on flexure 64 in use. Rigid region 68 transfers the spring force from spring region 67 to a load region 68a at the distal end of load beam 62. Load region 68a then transfers the spring force to flexure 64.

Flexure 64 includes a cantilever region 65 having a slider mounting surface to which a head slider 69 is mounted. A free end 65a of the cantilever region is movable vertically in response to pitch and roll movements of the head slider 69 and cantilever region 65. Flexure 64 further includes arms 65b and 65c that extend longitudinally from a proximal end of flexure 64 to a cross piece 65d on a distal end of flexure 64. Offset bends 66a and 66b are located in cross piece 65d of flexure 64 to provide a planar mounting region for head slider 69 and an offset between cantilever region 65 and arms 65b and 65c.

Dimple 66 is formed in cantilever region 65 of flexure 64, and dimple 66 confronts load region 68a of load beam 62. Dimple 66 provides a specific manner by which the spring force of spring region 67 is transferred from load region 68a of load beam 62 to cantilever region 65 of flexure 64, and furthermore, permits pitch and roll movements of the cantilever region 65 and head slider 69 as described in greater detail below. The dimple 66 acts as a "load point" between the flexure/head slider and the load beam, and dimples designed to serve this purpose are referred to as "load point dimples".

A load point dimple provides clearance between the flexure and the load beam, and serves as a point about which the head slider can gimbal in response to the aerodynamic forces generated by the air bearing. Variations in the rotating disk create fluctuations in these aerodynamic forces. The aerodynamic forces cause the head slider to roll about a longitudinal axis of the head suspension, and to pitch about an axis planar with the head suspension but perpendicular to the longitudinal axis. The load point dimple serves as the pivot point about which the flexure and head slider gimbal in response to the pitch and roll aerodynamic forces.

Lift tabs and load point dimples that are stamped or coined from sheet metal have a number of limitations. The extreme pressure used to stamp the parts causes the die surface to degenerate through metal transfer. The area of highest pressure can become rougher than it was before the stamping or coining operation. Because of the nature of the coining process, the highest pressure is typically at the apex of the feature, which is typically the operative surface. Features smoothed by the coining process still produce debris when rubbed, such as against a ramp or a tang in a gimbal assembly, causing particulate contamination inside the disk drive and hence reduced reliability.

Stamping and coining processes generate excess debris and increase the variation in the location and geometry of the load point dimple. In addition to stamping and coining, load point dimples can be "free formed" using a punch without a coining die. The punch is shaped to form the inside diameter of the load point dimple. Punch formed features tend to have rough surfaces due to the material being stretched during the forming process. A rough surface on a load point dimple can reduce gimbaling performance due to higher friction.

SUMMARY OF THE INVENTION

The present invention relates to a method of using pulsed laser energy to treat operative surfaces on lift tabs and load point dimples on a magnetic head disk drive suspension. The present method produces very smooth surfaces at a relatively low cost. The process is scalable for volume production. The present method can be used with operative surfaces having a wide variety of structures and shapes. The process provides for reduced particulate contamination inside a data storage hard drive, leading to higher reliability. In load point dimples, the reduced friction due to the smooth surfaces improves gimbaling. The present method of treating load point dimples also creates a more uniform geometry that reduces position variation caused during forming.

In one embodiment, the method of treating an operative surface includes patterning a laser beam such that a single pulse extends across the entire operative surface and applying one or more pulses of the laser energy to the operative surface sufficient to melt the operative surface. The melting serves to polish, smooth and/or reshape the operative surface.

The melting of the operative surface is typically to a depth of about 0.5 micrometers. The melting of the operative surface continues until a Ra surface roughness of about 100 to about 120 nanometers or less is achieved. The pulsed laser energy typically comprises a duration of about 1 to about 10 milliseconds. The entire operative surface preferably is melted simultaneously.

In one embodiment, the method includes determining a fluence and pulse duration such that a single pulse just starts to melt the tops of surface irregularities on the operative surface and repeating the pulse at a very rapid rate to achieve the desired level of polishing.

The present invention is also directed to a method for treating an area of a surface of a metal lift tab or load point dimple, wherein the surface has surface roughness features with a characteristic depth, the method comprising the step of: a) heating the area with an energy pulse having a power density sufficient to cause melting of the surface, wherein the heating is performed for a duration sufficient to melt the surface to a depth greater than the characteristic depth of the surface roughness features, and wherein the area is melted to a depth of less than 1.0 micrometers; b) cooling the area so that the area freezes.

In one embodiment, a mask is interposed between the source of the pulsed laser energy and the operative surface. The mask includes an aperture adapted to shape the laser energy to a shape generally corresponding to a shape of the operative surface. In some embodiments, the laser energy is directed through one or more lens located between the mask and the operative surface.

DETAILED DESCRIPTION OF THE INVENTION

Figure 4:
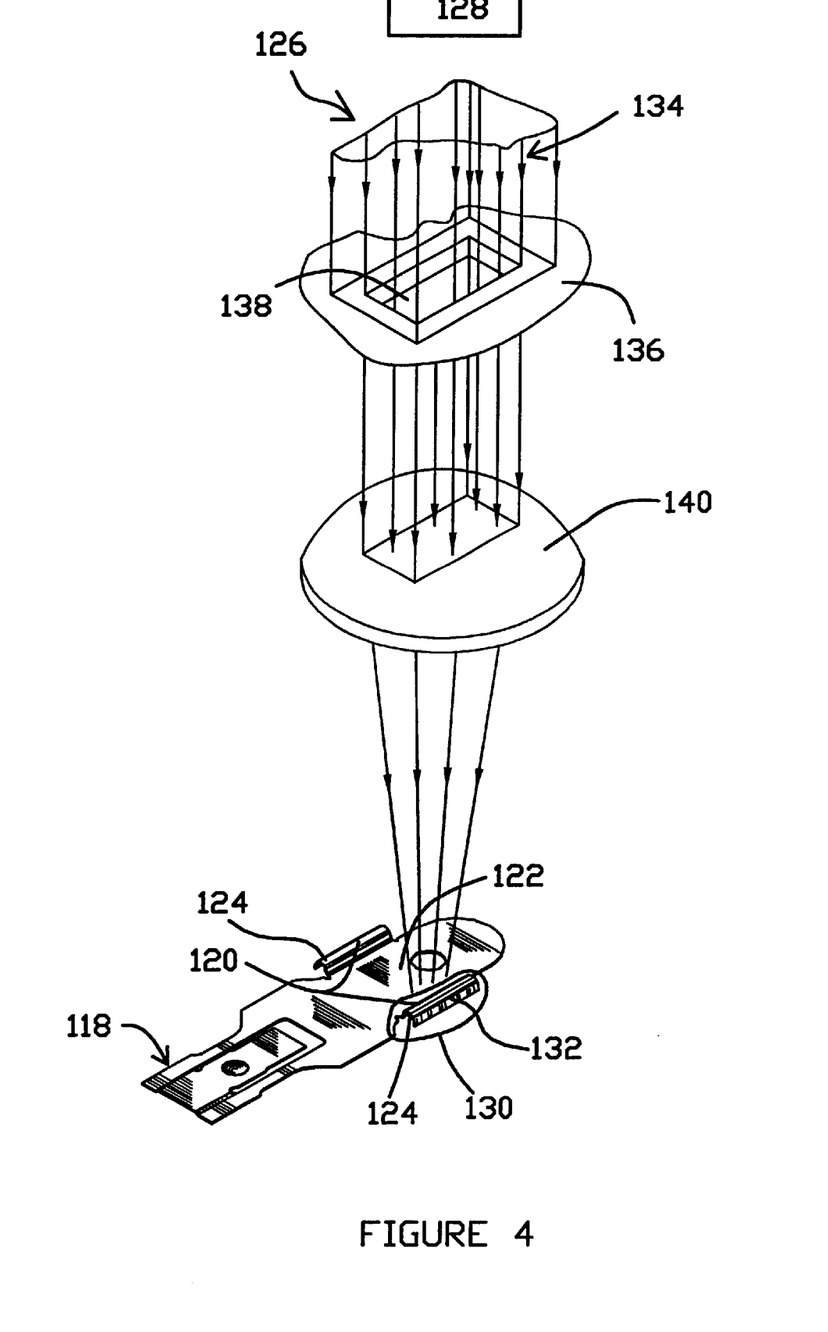
FIG. 4 is a schematic illustration of a system for laser treating an operative surface in accordance with the present method.

FIG. 4 illustrates a head gimbal assembly 118 with a pair of lift tabs 120 separated by flat region 122. Each of the lift tabs 120 includes curved portion 124. The curved portions 124 include operative surfaces 132 that engage a load/unload ramp (such as ramp 8 of FIG. 1) inside a disk drive. It will be appreciated that the invention is not limited to lift tabs having the described shape, but is also applicable to those having other shapes, such as disclosed in U.S. Pat. No. 5,739,982 (Arya et al.). As used herein, "operative surface" refers to a surface that is mechanically engaged with another surface on a head suspension. In the case of a load point dimple 66, the operative surface is the surface that engages with the load beam or the flexure on the head suspension (e.g., see FIG. 3).

In the preferred embodiment, the lift tab 120 is made of stainless steel (e.g. 305 stainless), but beryllium copper alloys, or spring steel or other suitable materials may also be used. The lift tabs 120 are typically produced by stamping and/or coining a piece of sheet metal. The lift tabs 120 have a thickness of about 25 micrometers to about 150 micrometers. The total size of each lift tab 120 is about 0.5 millimeters by about 2.0 millimeters. The curved portions 124 may make a line contact, or point contact, or area contact with the load/unload ramp of a data storage hard drive (see e.g., FIG. 1).

The system 126 of FIG. 4 includes laser 128 that generates laser beam 134 with a cross sectional area large enough to simultaneously extend across at least the operative surface 132. In practice, however, the laser beam 134 typically extends across a larger region 130, of which the operative surface 132 is a subset. Since the region 130 (referred to as the "treated region" after application of pulsed laser energy) includes the operative surface 132 of the lift tabs 120, scanning the laser beam 134 across the work piece is not required. Consequently, overlap marks are eliminated. The shape of the treated region 130 is determined by aperture 138 in mask 136 that the laser beam 134 is patterned through. The aperture 138 can be a simple geometric shape (such as a circle, square, rectangle, etc.) or any complex shape.

In at least some embodiments, after the laser beam 134 is shaped by the mask 136, it can be focused and sized by lens 140. The lens is typically located between the mask 136 and the treated region 130. The lens 140 typically does not change the shape of the laser beam 134 (or the shape of the treated region 130). Rather, the aperture 138 in the mask 136 sets the energy range and the shape of the laser beam 134, while the lens 140 adjusts the size of the laser beam 134 at the treated region 130 and the fluence or energy/unit area applied to the treated region 130. A typical lens 140 is a plano/convex or convex/convex lens. The lens 140 may be made from UV fused silica and is typically coated with a UV antireflection coating. A commercially available lens suitable for this application is the 50.8 millimeter, 500 millimeter focal length plano/convex lens with a broad band UV antireflection coating sold under model number SPX058 by Newport Corporation of Irvine, Calif.

As illustrated in FIG. 4, the lift tabs 120 are laser treated using a system 126 of the present invention. Each of the lift tabs 120 can be laser treated separately or simultaneously. As used herein, "laser treat" refers to polishing, smoothing and/or shaping an operative surface using one or more pulses of laser energy where each pulse extends across the entire operative surface. Overlap marks are not merely cosmetic, but cause a ridged or rough surface that interferes with the head gimbal assembly. By not scanning the laser beam across the operative surface, overlap marks are avoided.

Laser energy is delivered pulsed in short bursts. The laser 128 is preferably a short wavelength pulsed laser with a beam that is patterned to cover the entire operative surface 132, without scanning. The operative surfaces 132 are smoother than the portion of the flat region 122 outside of the treated region 130. The laser 128 preferably produces pulses of energy that melt only a thin surface layer of the lift tabs 120. The melted layer flows under surface tension forces, smoothing irregularities in the surface. The melted layer quickly refreeze due to heat conduction through the tab, producing a very smooth surface.

In one embodiment, an inert gas can be blown over the work piece to prevent oxidization. Alternatively, the treating operation can be performed in a sealed chamber containing nitrogen or an inert gas to prevent oxidization.

The laser 128 is preferably an Excimer laser operating at a wavelength of about 308 nanometers. Most metals absorb the relatively short wavelength of the Excimer laser. The cross-section of the laser beam 134 from the Excimer laser can be patterned to any two dimensional shape. The laser beam 134 can be patterned through an aperture or photo tool to give the desired shape. In the case of lift tabs 120, a generally rectangular shape is preferred. For load point dimples, discussed below, a circular shape is preferred. The treated region 130 is preferably larger than the operative surface 132 to compensate for positioning errors during treatment.

Although short wavelength pulsed lasers are preferable, other pulsed laser energy sources may be used, such as a Yag laser. Yag lasers, like most lasers are preferentially absorbed by different materials. For some metals, such as stainless steel, the iron phase of the solid solution will vaporize before much melting occurs in the nickel and chromium phase, resulting in a rough surface. A single pulse from a Yag laser can reduce this effect in some circumstances. Also, the longer wavelength of a Yag laser is absorbed deeper into the work piece. Multiple pulses from a Yag laser increases the depth of absorption, which may cause distortion of the work piece. Also, the longer wavelength Yag laser is difficult to pattern and is not preferred for some applications.

The depth of the treated region is determined by the beam fluence (Joules/centimeter$^2$), the pulse duration (microseconds), and the number of pulses used. Higher fluence, longer pulse duration, and/or a higher number of pulses will produce a deeper melt zone. Conversely, a lower fluence, shorter pulse duration and/or a fewer number of pulses will produce a shallower melt zone.

In one embodiment, a fluence and pulse duration is determined experimentally such that a single pulse just starts to melting the top of the surface irregularities. Then, the pulse is repeated at a very rapid rate to achieve the desired level of polishing. In the preferred embodiment, energy pulses have a duration of several milliseconds. Different laser parameters may be optimized for different materials, depending upon the desired melted spot depth and physical properties of the lift tab material.

Of course, the depth of a melt zone depends upon the physical characteristics of the lift tab. A thick, sturdy lift tab with large surface roughness features will require deep melted spots for smoothing. A thin, fragile lift tab with shallow surface roughness features will require shallow melted spots. Therefore, for a given lift tab, there will exist an optimum range of depths for the melted spot.

The treated region 130 is made of essentially the same material as the bulk of the lift tab 120. After treatment, however, the treated region 130 has different physical characteristics due to the melting and refreeze process. The treated region 130 has few, if any, cracks for example. The melting and refreeze process fills in the surface topography. Also, the treated region 130 may have a different crystal grain structure compared to the bulk of the lift tabs 120. Further, the treated region 130 has different contrast characteristics compared to the bulk of the lift tabs 120 when viewed with a scanning electron microscope (SEM) or optical microscope.

Figure 5:
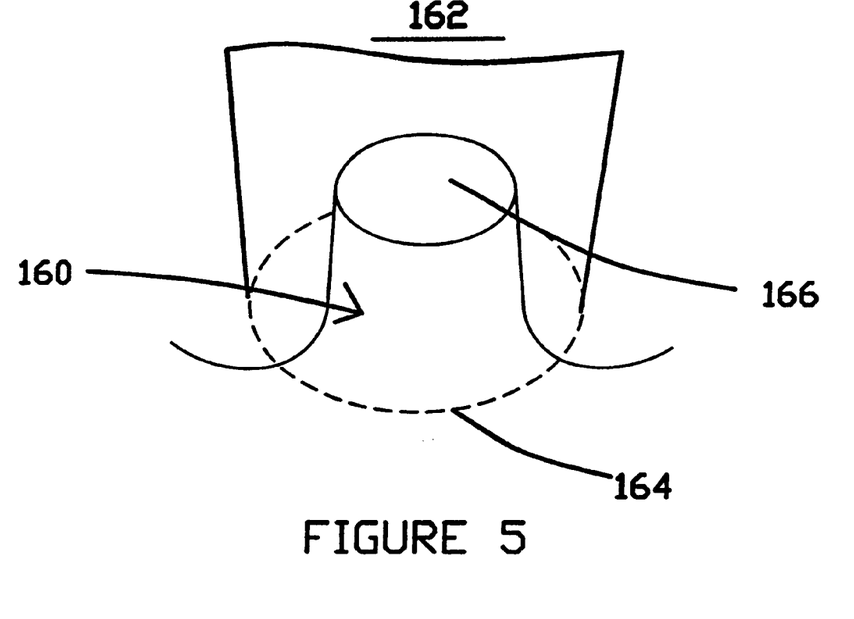
FIG. 5 is a perspective view of an etched load point dimple.

FIG. 5 illustrates an etched load point dimple 160 prior to laser treatment in accordance with the present method. The etched load point dimple is formed by applying a masking material to the region 166 and etching away the surrounding material. In the embodiment of FIG. 5, laser beam 162 is patterned to comprise a generally circular treated region 164 with a cross-sectional shape having a diameter slightly greater than the diameter of the operative surface 166.

Figure 6:
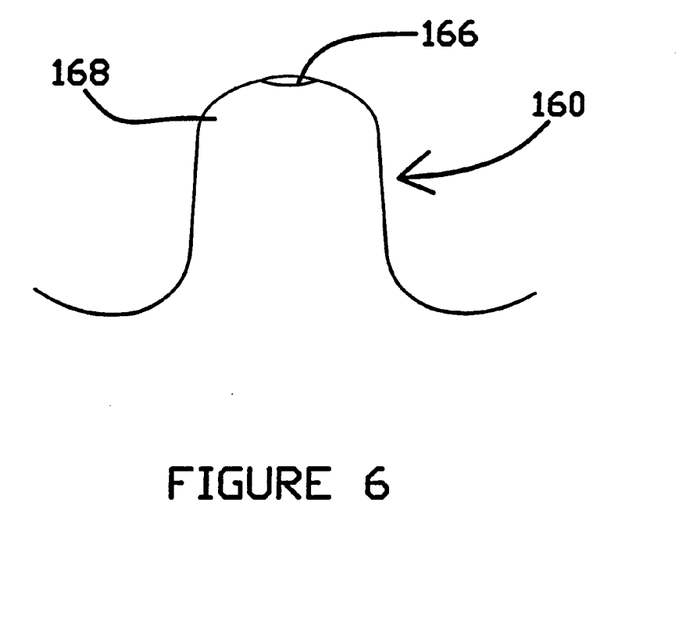
FIG. 6 is a perspective view of the load point dimple of FIG. 5 after treatment in accordance with the present invention.

FIG. 6 illustrates the load point dimple 160 after treatment. The operative surface 166 is reduced in size and edges 168 are a curvilinear shaped. Rounding the etched dimple 160 using the present laser polishing method provides a single consistent operative surface 166. If the operative surface 166 of FIG. 5 is used, the component gimballing on it will roll around the sharp edge causing the actual point of contact or load point to move. Additionally, the combination of reducing the surface area of the operative surface 166 and the curvilinear edges 168 reduces friction and stiction between the load point dimple 160 and other components in a head suspension. Stiction refers to friction that tends to prevent relative motion between two movable parts at their null position.

Figure 7:
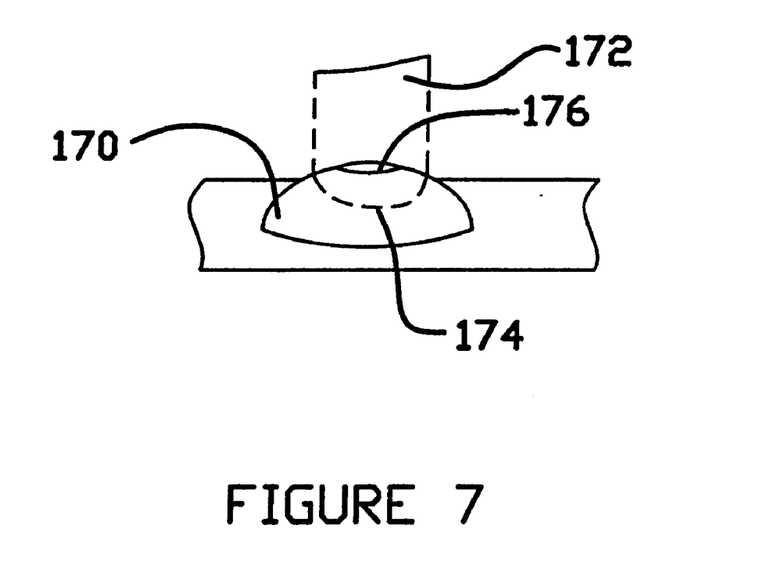
FIG. 7 is a perspective view of a formed load point dimple.
Figure 8:
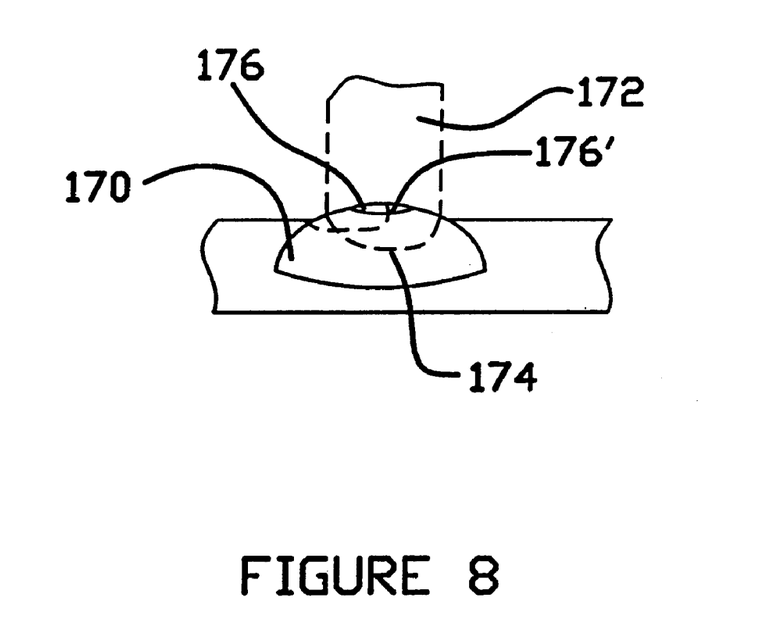
FIG. 8 is a perspective view of the load point dimple of FIG. 7 after treatment in accordance with the present invention.

FIG. 7 illustrates a formed load point dimple 170. Laser beam 172 is patterned to have a generally circular shape. The cross-sectional area of the laser beam 172 defines a treated region 174 with a diameter slightly greater than the diameter of the operative surface 176. The laser beam 172 polishes and smoothes operative surface 176. As illustrated in FIG. 8, the laser beam 172 can optionally reshape the dimple load point 170 contour so that the location of operative surface 176 is shifted to location 176'.

The load point dimple can be located on the load beam of a head suspension so that the convex surface of the dimple contacts a surface of the cantilever region of the flexure where the head slider is mounted. Alternatively, the dimple can be formed in a surface of the cantilever region of the flexure so that its convex surface contacts the load beam (see FIG. 3). In a load point dimple application, the operative surface 166 refers to the portion of the dimple 160 that engages with either the load beam or the flexure.

Figure 9:
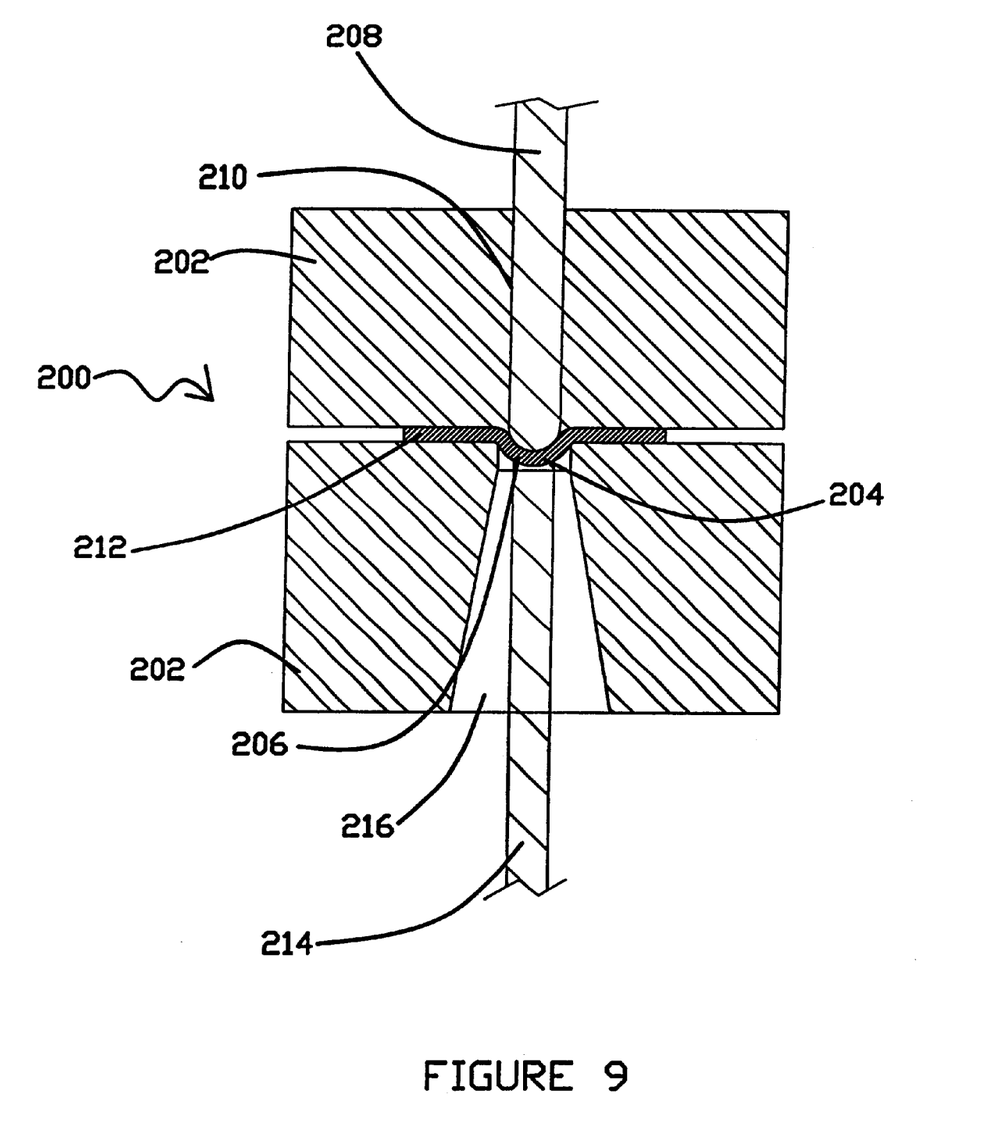
FIG. 9 is a sectional view of a method of free forming and laser polishing a load point dimple in accordance with the present invention.

FIG. 9 illustrates a method 200 of free forming and laser polishing load point dimple 204 in accordance with the present invention. Forming tool 202 is adapted to both free forming the load point dimple 204 and laser polishing operative surface 206. Free forming refers to using a dimple forming tool or punch without a coining die. The punch 208 is driven through opening 210 to form the load point dimple 204 in head suspension 212. The punch 208 is shaped to form the inside diameter of the load point dimple 204. Laser beam 214 is directed through opening 216 to treat at least the operative surface 206 of the load point dimple 204 while the head suspension 212 is still located in the forming tool 202. This method permits accurate positioning of the laser beam 214 on the operative surface 206 of the load point dimple 204. Accurate registration also permits the laser beam 214 to be patterned substantially the same size as, or slightly larger than, the operative surface 206 to be treated. In one embodiment, the process is timed so that the laser fires at the bottom of the punch stroke of the punch 208, while some or all of the energy imparted by the punch 208 is still resident in the head suspension 212.

The method of the present invention is to simultaneously apply pulsed laser energy to an entire operative surface on a head suspension. The amount of laser energy applied is dependent upon the characteristic depth of the feature roughness of the operative surface, typically represented as the peak-to-valley height of surface features, or the depth of the surface topography. The treated region is melted to a depth that is equal to or greater than the characteristic depth of the surface roughness features. Therefore, the desired depth of the treated region depends upon the roughness features of the operative surface. The depth of the treated region is preferably slightly greater than the characteristic depth of the surface roughness features. In the method of the preferred embodiment, it is important to minimize the amount of heating of the treated region 130, 164 to minimize warping of the head suspension. Lift tabs and load point dimples treated according to the method described herein have exceptionally smooth surfaces that minimize friction and stiction with mating components.

EXAMPLES

The present method was used to treat a head lift tab on a stainless steel head suspension sold under model number 0240085, available from Hutchinson Technology Corporation of Hutchinson, Minn. The region of treatment had a thickness of about 0.100 millimeters. An Excimer laser operating at about 308 nanometers was pulsed ten times for a duration of about 1 to about 10 milliseconds each at a fluence of about 2.7 Joules/centimeter$^2$. The treatment produced a melt depth of about 0.5 micrometers. The starting surface finish was about 300 nanometers Ra and the ending surface finish was about 100–120 nanometers Ra. The operative surface was substantially free of ridges and waves.

All patents and patent applications disclosed herein, including those disclosed in the background of the invention, are hereby incorporated by reference. Although the present invention has been described with reference to preferred embodiments, workers skilled in the art will recognize that changes may be made in form and detail without departing from the spirit and scope of the invention. In addition, the invention is not to be taken as limited to all of the details thereof as modifications and variations thereof may be made without departing from the spirit or scope of the invention.

What is claimed is:

1. A method of treating an operative surface on a head suspension for a rigid disk drive, the head suspension including a load beam with a mounting region at a proximal end, a rigid region at a distal end and a spring region between the mounting region and the rigid region, the method comprising the steps of
    patterning a laser beam such that a single pulse extends across the entire operative surface; and
    applying one or more pulses of the laser energy sufficient to laser treat the operative surface.

2. The method of claim 1 comprising melting the operative surface to a depth of about 0.5 micrometers.

3. The method of claim 1 comprising melting the operative surface until an Ra surface roughness of about 120 nanometers or less is achieved.

4. The method of claim 1 wherein the pulsed laser energy comprises a duration of about 1 to about 10 milliseconds.

5. The method of claim 1 wherein the entire operative surface is melted simultaneously.

6. The method of claim 1 wherein the operative surface comprises stainless steel.

7. The method of claim 1 comprising the steps of:
    determining a fluence and pulse duration such that a single pulse just starts to melting tops of surface irregularities on the operative surface; and
    repeating the pulse at a very rapid rate to achieve the desired level of polishing.

8. The method of claim 1 comprising applying one or more pulses of laser energy sufficient to reshape a portion of the head suspension and relocate the operative surface.

9. The method of claim 1 wherein the step of patterning the laser beam comprises the step of interposing a mask between a source of the laser beam and the operative surface.

10. The method of claim 9 wherein the mask comprises an aperture adapted to shape the laser beam to a shape generally corresponding to a shape of the operative surface.

11. The method of claim 9 comprising directing the laser beam through a lens located between the mask and the operative surface.

12. The method of claim 9 wherein the step of patterning the laser beam comprises the step of interposing at least one lens between the mask and the operative surface.

13. The method of claim 1 wherein the operative surface comprises a lift tab.

14. The method of claim 1 wherein the operative surface comprises a load point dimple.

15. A method of treating an operative surface of a head suspension assembly, comprising the steps of simultaneously applying pulsed laser energy to a region that extends across at least the operative surface of the lift tab sufficient to melt the operative surface to a depth of about 0.5 micrometers until the operative surface has an Ra surface roughness of about 120 nanometers or less.

16. The method of claim 15 wherein the entire operative surface is melted simultaneously.

17. The method of claim 15 comprising the steps of:

determining a fluence and pulse duration such that a single pulse just starts melting tops of surface irregularities on the operative surface; and repeating the pulse at a very rapid rate to achieve the desired level of polishing.

18. The method of claim 15 comprising the step of interposing a mask between a source of pulsed laser energy and the operative surface.

19. The method of claim 18 wherein the mask comprises an aperture adapted to shape the pulsed laser energy to a shape generally corresponding to a shape of the operative surface.

20. The method of claim 18 comprising directing the pulsed laser energy through a lens located between the mask and the operative surface.

21. The method of claim 18 wherein the step of patterning the pulsed laser energy comprises the step of interposing at least one lens between the mask and the operative surface.

22. A method of treating a load point dimple on a head suspension for a rigid disk drive, the head suspension having a load beam with a mounting region, a rigid region and a spring region located between the mounting region and rigid region, the load beam having a flexure, the method comprising the steps of:

creating a load point dimple on the load beam; and patterning a laser beam such that a single pulse of laser energy extends across an entire operative surface on the load point dimple; and applying one or more pulses of the laser energy to the operative surface of the load point dimple sufficient to melt the operative surface.

23. The method of claim 22 wherein the pulsed laser energy is sufficient to reshape the load point dimple.

24. The method of claim 22 wherein the pulsed laser energy is sufficient to shift the operative surface on the load point dimple.

25. The method of claim 22 wherein the load point dimple is created by etching.

26. The method of claim 22 wherein the load point dimple is created by forming.

27. The method of claim 22 comprising the step of interposing a mask between a source of the pulsed laser energy and the operative surface.

28. The method of claim 27 wherein the mask comprises an aperture adapted to shape the pulsed laser energy to a shape generally corresponding to a shape of the operative surface.

29. The method of claim 27 comprising directing the pulsed laser energy through a lens located between the mask and the operative surface.

30. The method of claim 27 wherein the step of patterning the pulsed laser energy comprises the step of interposing at least one lens between the mask and the operative surface.

* * * * *